United States Patent
Pöting (10) Patent No.: US 6,282,922 B1
(45) Date of Patent: Sep. 4, 2001

(54) METHOD OF PRODUCING MOLDED GLASSES BODIES ACCORDING TO THE PRESS MOLDING METHOD, AND AN APPARATUS PARTICULARLY SUITED FOR EXECUTING THIS METHOD

(75) Inventor: Klaus Pöting, Erkrath (DE)

(73) Assignee: Poting GmbH & Co., KG, Erkrath (DE)

(*) Notice: Subject to any disclaimer, the term of this patent is extended or adjusted under 35 U.S.C. 154(b) by 318 days.

(21) Appl. No.: 08/809,629

(22) PCT Filed: Oct. 13, 1995

(86) PCT No.: PCT/DE95/01421

§ 371 Date: Apr. 17, 1997

§ 102(e) Date: Apr. 17, 1997

(87) PCT Pub. No.: WO96/12681

PCT Pub. Date: May 2, 1996

(30) Foreign Application Priority Data

Oct. 19, 1994 (DE) ............................................ 94 16 814 U (51) Int. Cl.$^7$ ..................................................... C03B 1/16
(52) U.S. Cl. .................................. 65/29.1; 65/42; 65/48; 65/76; 65/224; 65/225; 65/304
(58) Field of Search .................................. 65/68, 72, 76, 65/42, 48, 223, 224, 225, 304, 320

(56) References Cited

U.S. PATENT DOCUMENTS

| | | | |
|---|---|---|---|
| 1,678,233 | * | 7/1928 | Soubier ................................. 65/225 |
| 1,679,848 | * | 8/1928 | Barker, Jr. ............................. 65/223 |
| 1,852,570 | * | 4/1932 | Hofmann ............................... 65/224 |
| 2,179,317 | | 11/1939 | Barnard . |
| 2,478,812 | * | 8/1949 | Drake ..................................... 65/156 |
| 3,595,637 | | 7/1971 | Eldred et al. . |
| 4,225,331 | * | 9/1980 | Bittner et al. ........................... 65/48 |
| 5,236,485 | * | 8/1993 | Leweringhaus et al. ............. 65/29.1 |

FOREIGN PATENT DOCUMENTS

| | | |
|---|---|---|
| 308109 | 4/1917 | (DE) . |
| 28 32 067 B2 | 8/1980 | (DE) . |
| 2 549 817 A1 | 2/1985 | (FR) . |
| 564304 | 9/1944 | (GB) . |
| 1137471 | 12/1968 | (GB) . |

* cited by examiner

*Primary Examiner*—Sean Vincent
(74) *Attorney, Agent, or Firm*—Vickers, Daniels & Young (57) ABSTRACT

The method of the invention provides that a predetermined quantity of molten glass necessary for producing molded glass bodies according to the press-molding method is poured into a press mold prior to the insertion of the molding plug while the press mold is located in the press station, and that the molded glass body is removed after the molding plug is withdrawn from the press mold, with this mold likewise being located in the pressing station. This method renders a mold transport superfluous. The invention also relates to an apparatus suitable for executing the method, in which the molding plug can be pivoted laterally from its initial position located outside of the press mold about an axis extending transversely to the center axis of the molding plug.

9 Claims, 10 Drawing Sheets

METHOD OF PRODUCING MOLDED GLASSES BODIES ACCORDING TO THE PRESS MOLDING METHOD, AND AN APPARATUS PARTICULARLY SUITED FOR EXECUTING THIS METHOD

BACKGROUND OF THE INVENTION

The invention relates to a method of producing molded glass bodies in accordance with the press-molding method, and to an apparatus particularly suited for executing this method.

Generally, the methods used for molding glass bodies are those which involve a plurality of press molds disposed with constant angular spacing on a rotatable machine table. After the press mold that is located under a filling apparatus, the so-called feeder, has been filled with a predetermined quantity of molten glass, the table is turned by the angular distance of two adjacent press molds, so that the one now containing the molten glass is positioned under a molding plug. The molding plug, which determines the interior shape of the molded glass body, is lowered into the mold and presses the molten glass into its actual exterior shape. During this procedure, the adjacent press mold, which is now located under the feeder, is filled with molten glass. After the minimum time required to complete the forming of the glass body, which is usually in a range of a few seconds, the molding plug is withdrawn from the press mold, the machine table is rotated again by the angular distance of two adjacent molds, and the cycle starts over.

The completed molded glass body remains in its press mold until it has cooled, through radiant emission and in particular through heat dissipation via the press mold, to the point at which it has solidified into a dimensionally-stable body. Typically, the time required for cooling significantly exceeds the pressing time for completing the molding procedure, so the molded glass body has to be cooled in the mold for the duration of several cycles. Therefore, the machine table must be equipped with at least enough press molds that the time required for transport from the pressing station to an unmolding station at least corresponds to the time required for cooling. The formula for the cooling time $t_k$ is:

$$t_k = (z-1)t_p = zt_T,$$

where z is the number of cycles, $t_T$ is the pressing time and $t_P$ is the time the rotating table requires to turn by an angular distance corresponding to the spacing between two adjacent molds. The capability of such a method, therefore, does not merely depend on the minimum pressing time required for molding the glass body, but it is substantially limited by the time required to cool the molded glass body until it solidifies.

Hence, a significant disadvantage of the procedure is that the capability of the method cannot be increased significantly, even with the use of more expensive and more efficient pressing drives, which allow for faster molding of the glass body.

SUMMARY OF THE INVENTION

The object of a method known in the related art, but not previously published, and an apparatus particularly suited for executing the method is to overcome these disadvantages.

In the method, the molding plug remains in contact with the molded glass body in the press mold following the actual pressing process. Thus, the contact with the metal molding plug allows an intensive heat transfer from the inside of the molded glass body to the molding plug, in addition to the dissipation of heat from the outside of the molded glass body via the press mold. Thus, in comparison to conventional methods, in which cooling air is often injected into the interior of the molded glass body, the molding plug effects a significantly more effective cooling of the inside of the molded glass body. This translates into a significant reduction of the time span over which the molded body must remain in the mold until at least the regions close to the surface have cooled to a temperature at which the molded body possesses sufficient inherent stability to be removed from the mold and transferred to a cooling station. Therefore, in this method, the mold is ready to be used in another pressing process after only a short time.

A disadvantage of these known methods is that a predetermined quantity of molten glass for the molded glass body is introduced into a separate filling station disposed upstream of the pressing station; on the one hand, the separate filling station increases the structural outlay for an apparatus suitable for executing this method, and, on the other hand, the time needed to transfer the mold from the filling station into the pressing station limits the maximum performance achievable with this method.

It is thus an object of the invention to develop a method with which this limitation of the capability of a glass-molding machine is eliminated without necessitating a significantly greater outlay for machinery. It is further an object of the invention to provide a glass-molding apparatus that is particularly suited for executing this method.

These objects are accomplished by the method and the glass molding apparatus disclosed in the application.

Because the predetermined quantity of molten glass is poured into the press molds located in the pressing station prior to the insertion of the molding plug, it is possible to omit the separate filling station disposed upstream of the pressing station with regard to the succession of method steps over time, which station is often a standard feature of conventional methods. Furthermore, the molded glass body can also be withdrawn from the press mold while the mold is located at the pressing station, eliminating the need for a mold transport. These measures not only decrease the structural outlay for an apparatus suitable for executing the method of the invention—for example by saving the mold needed thus far for the separate filling station—but also increase the capability of the method in this invention in comparison to conventional methods by saving the transport of the mold that has been filled with a predetermined quantity Of molten glass from the filling station to the pressing station, and possibly the transfer of the mold from the pressing station to the withdrawal station.

The molding plug is pivoted laterally, from its inoperative position for the filling process of the predetermined quantity of molten glass about an axis transverse to the lengthwise axis of the molding plug. This measure increases the space above the opening of the press mold that is available for the glass-filling process in the pressing station, which permits the apparatuses necessary for filling, even those of more voluminous structure, to be positioned problem-free above the opening of the mold. Thus, it is possible to avoid the use of special filigree apparatuses for filling, which would mean an increased structural outlay and greater susceptibility to failures. In addition, withdrawing the molded glass body from above is manageable without necessitating lifting the plug out of the mold by a large stroke to create the necessary free space, which would negatively influence the capability achievable in this method.

With a low structural outlay and particular reliability, the mold can be filled with the predetermined quantity of molten glass after rotation of the molding plug if a feeding chute connected by the so-called feeder is rotated from an initial position that permits the insertion of the molding plug into the press mold into a position in which the open end of the supply line communicates with the mold opening, with the chute rotating back to its initial position after the filling process is complete.

The capability of the method according to the invention can be greatly increased if the predetermined quantity of molten glass is concurrently supplied to a plurality of molds located in the pressing station prior to the insertion of the molding plug, and glass bodies are pressed from molten glass with a corresponding number of molding plugs. The increase in capability is achieved with a relatively low additional structural outlay, involving only the additional molding plugs, press molds and devices for filling the press molds with the predetermined quantity of molten glass.

A modification of the method of the invention for a possible application is also disclosed. In this embodiment, partial molded bodies—for example, two halves of a glass module—that can be joined to form a single component are pressed concurrently in at least two press molds. After the partial molded bodies have cooled, at least in the regions near their surfaces, to a temperature that allows them to be withdrawn from the press molds, they are withdrawn with the aid of an apparatus known per se, and transferred directly to another known apparatus that joins the partial bodies. Since only a relatively short period of time is needed for the transfer process, the heat retained in the halves can be used in the joining process. Therefore, the amount of energy necessary to reheat the adjoining surfaces in order to form the seam point can be reduced considerably in comparison to conventional methods.

In another advantageous modification of the method, a pressing station comprises a sequence of different press molds and molding plugs, which serve in multiple-step formation of a molded glass body. To this end, various parts of the molded body are molded concurrently in different press molds, which are configured such that each partial piece produced in an earlier cycle and adjacent to the [part] to be formed can be inserted into the press mold, with the exception of the first press mold in the sequence, such that the formation of the further part of the molded glass body and its joining with the adjacent part are effected concurrently in the molding process. The partial piece inserted into the press mold need not be produced in the same sequence, but can originate from another apparatus, for example from a blowing machine.

A glass-molding apparatus that is particularly suited for executing the method of the invention is disclosed. It is, nevertheless, also possible to use this glass-molding apparatus advantageously in the execution of conventional methods. Because the molding plug can be pivoted laterally— with respect to the pressing direction—from its inoperative position outside of the press mold, a press mold located in the pressing station is easily accessible without necessitating disassembly. Consequently, necessary manipulations can be made to the press mold with relatively little effort in comparison to conventional glass-molding apparatuses. Furthermore, after the molding plug has been pivoted, the opening of the press mold is easily accessible, so the predetermined quantity of molten glass can be poured into the press mold located in the pressing station, even by relatively voluminous filling devices. In principle, it would also be possible to enlarge the free space above the press mold employing a particularly long stroke of the molding plug. This measure, however, would stipulate larger apparatus dimensions, and would decrease the capability of the apparatus due to the time necessary for performing the long stroke movement.

The predetermined quantity of molten glass needed for the molded glass body is supplied by the feeder, preferably with the aid of feeding chutes which, when the molding plug is laterally pivoted, can be displaced into a position in which the chute end communicates with the opening of the press mold.

The glass-molding apparatus advantageously effects a fast, precise and low-maintenance power transmission from the force generator to the molding plug if it includes a pressing rod that is guided to be displaceable in its axial direction, cooperates with the force generator with one end and operates the molding plug with the other end.

In a first preferred embodiment of the glass-molding apparatus, the ability of the molding plug to pivot is achieved structurally if a pivoting bracket, which pivots about its axis transverse to the pressing direction, is mounted to the frame of the apparatus. The bracket comprises a rail arrangement on which the molding plug is seated via a carriage. The carriage allows the molding plug to be pressed into the press mold to perform the actual pressing process.

The bracket is preferably supported on a pivoting device of variable length that acts perpendicularly to the pivoting axis and is mounted to the frame so that, not only can the molding plug pivot about the pivoting axis, it can also be fixed at any desired angle with the aid of the pivoting device.

A particularly preferred embodiment of the variable-length pivoting device, in which the device includes a pivoting rod that is hinged by one end to the bracket and is guided to be displaceable in its axial direction is disclosed. The other end of the rod rests against a cam disk driven by an electric motor.

In the first preferred embodiment, the connection of the pressing rod to the molding plug is advantageously achieved via a knee link whose hinge axis extends parallel to the pivoting axis.

To assure an especially effective power transmission from the force generator to the molding plug, hence achieving higher pressing pressures, it is advantageous to dispose the pressing rod such that its center axis extends flush with the center axis of the molding plug during the pressing process.

The time required to fill the press mold with the predetermined quantity of molten glass is minimized if the feeding chute is displaced into its filling position at the same time that the molding plug pivots out of its inoperative position. A particularly structurally simple measure suited for this purpose includes a feeder chute hinged to the frames and connected to the pivotable bracket.

The access to a press mold, the withdrawal of a molded glass body from the press mold and the transport of the molded glass body are simplified if the molding plug can be pivoted from its initial position toward the closed side of the apparatus frame.

A second preferred embodiment of the glass-molding apparatus, which is particularly suited for molded glass bodies that can be produced simply with lower pressing forces, is disclosed. In this glass-molding apparatus, a rail arrangement provided with a carriage structure that is displaceable in the pressing direction is provided on the frame. This carriage structure supports a retainer that protrudes from the closed side of the frame during the pressing process, and to which the molding plug is secured. Since the retainer can be pivoted back to the closed side of the frame about an axis disposed in the region of the carriage structure when the molding plug is outside of the press mold, only a relatively short movement is necessary for achieving the desired amount of free space above the press mold due to the relatively small distance between the pivoting axis and the molding plug. Consequently, the clock frequency and thus also the capability of the glass-molding apparatus can be increased.

If the retainer is approximately U-shaped such that the open side of the U faces the press mold during the pressing process, and the pivoting axis extends through one leg of the U, whereas the other leg supports the molding plug, then pivoting angles of 90° suffice to completely uncover the open side of the press mold.

To ensure the desired pivotability of the retainer supporting the molding plug in this preferred embodiment of the glass-molding apparatus, it is advantageous if the end of the pressing rod that operates the molding plug is connected to the carriage structure. The pressing force to be applied via the molding plug is limited, however, because it must be transferred from the retainer to the molding plug.

In a particularly advantageous embodiment the force generator comprises a cam disk driven by an electric motor with adjustable torque and speed. This embodiment permits the molding plug to be inserted particularly quickly and with high precision, on the one hand, and on the other hand, this force generator is distinguished by the fact that it can be produced economically and requires little maintenance. In addition, the noise level is low during operation.

Because the electric motor driving the cam disk has adjustable torque and speed, the forward feed with which the molding plug is inserted into the press mold, as well as the force exerted on the molded glass body during the pressing process, can be easily adapted to the requirements specified for the molded glass body. If necessary, a "pressing force program" can be implemented by varying the current with which the electric motor is charged, i.e., the pressing force can be varied during the pressing process. Through the selection of a corresponding cam disk shape, the speed course of the forward feed can be mechanically preselected while the molding plug is lowered, so that this course can also be adapted to individual requirements specified for the respective molded glass body or the glass material used.

In a preferred embodiment the electric motor is a three-phase servomotor, because this type of motor permits particularly fine-sensory control of the speed and the torque it generates. The molding plug can also be withdrawn precisely from the press mold if a countercam disk is used to withdraw it.

Tests have shown that particularly good pressing results are achieved if the device for withdrawing the molding plug is an elastic element exerting force on the pressing rod counter to the pressing direction.

It is, however, also possible to effect the withdrawal of the plug using a hydraulically- or pneumatically-driven cylinder or a counterweight.

The elastic element requires little maintenance and can be produced economically if it comprises at least a coil spring.

To increase the capability of a glass-molding apparatus of the invention, it is advantageous if a plurality of press molds is provided with a corresponding number of molding plugs, with each being associated with a press mold.

A possible preferred application of such an apparatus provides that the press molds and the molding plug are configured such that partial molded bodies that can be joined to form one component are pressed in a pressing process. It is further advantageous if a device is provided to withdraw the partial molded bodies from the press molds and transfer them to an apparatus so they can be joined. With this measure, it is possible to transfer the partial molded bodies to the joining apparatus within a short time after at least the regions near the surface have cooled to a temperature such that they possess the necessary rigidity to be withdrawn and transported. Due to the substantial amount of heat still stored in the partial molded bodies at this time, the energy required to join the partial molded bodies is reduced considerably in comparison to conventional methods, in which a relatively long period of time elapses between the pressing and joining steps.

The subject of another embodiment of the invention includes a glass-molding apparatus equipped with a plurality of press molds and a corresponding number of molding plugs. This device comprises a sequence of press molds and molding plugs that serve to form the molded glass bodies in multiple steps.

It is also particularly advantageous if the sequence comprises press molds and molding plugs with which different parts that combine to form the entire molded glass body can be pressed during a pressing process.

If the press molds after the first press mold in a sequence, are configured such that the part of the molded glass body pressed in the previous sequence can be inserted into the press mold in the following sequence, and the part to be pressed therein can be simultaneously pressed and attached to the inserted part. Thus, a later joining of the individual parts of the molded glass body is eliminated, which can save further process steps.

BRIEF DESCRIPTION OF THE DRAWINGS

The drawings schematically illustrate the method of the invention, as well as a glass-molding apparatus that is particularly suited for use of the method of the invention in which.

DETAILED DESCRIPTION OF THE INVENTION

Hereinafter "above" and "below" refer to the upright operation of the respective glass-molding apparatus shown in FIGS. 2 through 8.

Figure 1:
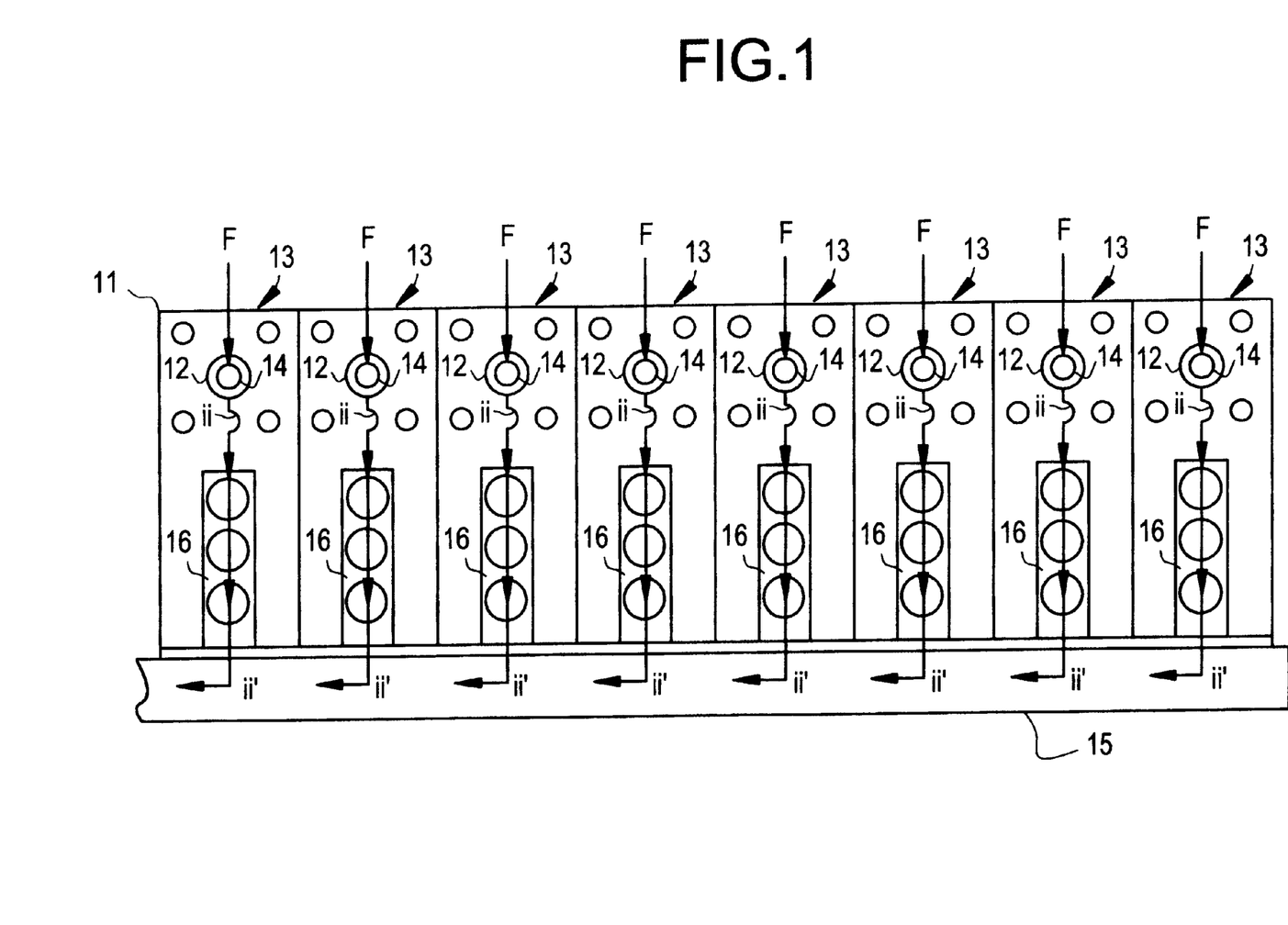
FIG. 1 a representation of the method of the invention employing a linear, eight-mold table and eight molding plugs.
Figure 2:
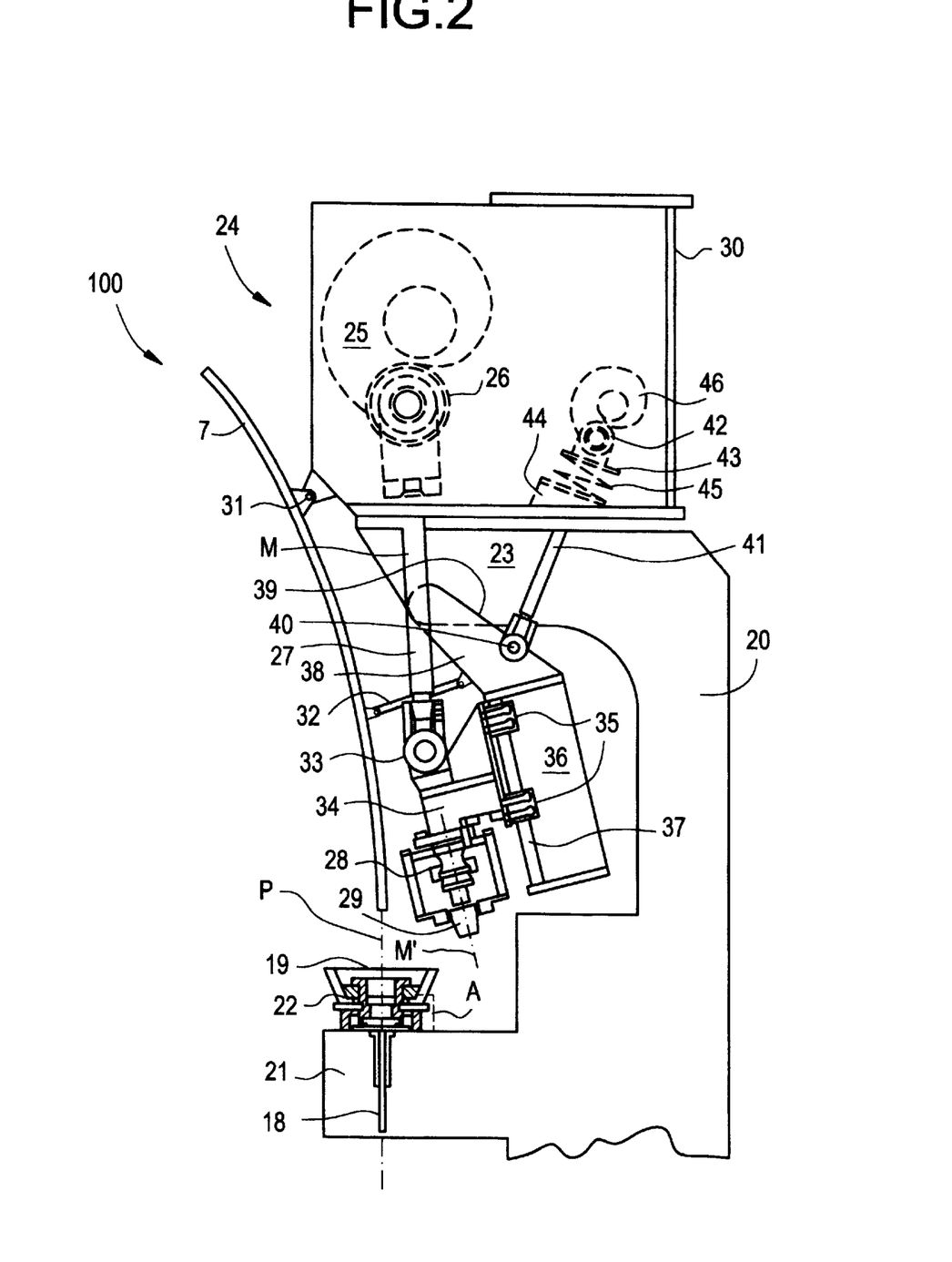
FIG. 2 a side view of an embodiment of the glass-molding apparatus particularly suited for executing the method of the invention, while the predetermined quantity of molten glass is being filled and the molding plug is pivoted.

FIG. 2 explains the course of the method according to the invention using the example of an apparatus that includes a linear machine table 11 having eight press molds 12, as well as a glass-molding apparatus 13 comprising eight molding plugs 14. To produce a molded glass body, first a feeder, which is equipped with a pivoting feeder chute, not shown in the drawing, is used to pour a predetermined quantity of molten glass into the respective press mold located in the pressing station. This filling process, in which the feeder pours corresponding quantities of glass consecutively into the respective press mold, is represented by the arrow F in FIG. 1. In this apparatus, the filling F of the predetermined quantity of molten glass occurs in the manner described in conjunction with FIG. 1. It is also possible, however, to pour predetermined quantities of molten glass simultaneously into press molds 12 located in the pressing station if a feeder is provided for each feeder chute and, likewise, for each press mold.

After completion of the filling process and the return pivoting of the feeder chutes and molding plugs 14, the plugs are simultaneously pressed into press molds 12 and remain in contact with the molded glass body until the regions near the surface of the molded body have cooled to a temperature such that it possesses sufficient inherent stability to be transferred to a cooling station. Subsequently, the transfer Ü of the molded body to cooling station 16 is effected; the station can comprise a cold-air blower or cooling molds, not shown in the drawing, that further lower and even out the temperature of the molded glass bodies. The molded glass bodies are cooled at the cooling station until they have solidified completely. They are then transferred to a conveyor belt 15 in another transfer step Ü.

If necessary, it is also possible to omit downstream cooling molds and, instead, to measure the time spent by the molding plug in the molded glass body such that the molded body solidifies completely in the press mold.

A glass-molding apparatus that is particularly suitable for executing the method of the invention is explained below in conjunction with FIG. 2.

The glass-molding apparatus 100 comprises a frame 20, from which a press bed 21 protrudes, the surface of which lies in a horizontal plane. The press bed 21 supports a press mold 22 on its top side. This mold is equipped with a withdrawal element 18, by means of which a molded glass body 9 located in the press mold 22 is lifted out of the mold to be transferred to downstream processing stations, possibly after the separation of the partial molds in a vertically-partitioned press mold. Above the press bed 21, the frame 20 terminates in a fixed bracket 23 that supports the pressing drive 24 on its top side.

The pressing drive 24 comprises a cam disk 25 driven by a three-phase servomotor, not shown in the drawing, and acts on a roller 26 attached to the upper end of a pressing rod 27 seated to be displaceable in the direction of its longitudinal axis in the bracket 23 and pivotable about the axis of the roller 26.

The pressing rod 27 is connected to a retainer 34 via a knee joint 33, the axis of which extends parallel to the axis of the roller 26; at its lower end, the retainer 34 supports the molding plug 29, which can be mounted with the aid of a quick-fixing attachment 28. On its side facing the frame 20, the retainer 34 comprises a carriage structure 35, which is seated on a rail arrangement 37 disposed with a bracket 36 seated on the bracket 23 so as to pivot about a horizontal axis. The rail arrangement is conceptualized such that, with a vertical orientation, the retainer 34 can be displaced so that the molding plug 29 mounted on the underside of the retainer 34 can be pressed into the press mold 22.

Above the rail arrangement 37, the retainer 34 has a support arm 38 oriented that is diagonally upward from its side facing the frame 20 and produces the pivotable connection of the bracket 36 with the fixed bracket 23 of the frame 20 via a bearing that is not shown.

From the side 39 facing the frame 20, a pivoting rod 41 connected to the frame via an articulated connection 40 extends diagonally upward, and supports a roller 42 at its lower end. Below the roller 42, a spring plate 43 is attached to the pivoting rod 41, against which plate a pressure-loaded coil spring 45 is supported whose other end rests in a seat 44 provided on the bracket 23.

A stop for the pivoting rod under spring force is formed by a cam disk 46, which is driven via a three-phase servomotor not shown in the drawing. The eccentricity of the cam disk and the length of the pivoting rod 41 are dimensioned such that the bracket 36 can pivot between a return-pivoted, angular position, in which the molding plug 29 uncovers the opening 19 of the press mold 22, and a position in which the rail arrangement 35 extends vertically and the center axes M, M' of the pressing rod 27 and the molding plug 29, respectively, coincide with the perpendicular pressing axis P, along which the molding plug 29 is pressed into the press mold 22.

The pivoting rod can, of course, also be driven with means other than the cam disk, for example hydraulic or pneumatic piston/cylinder units.

The supply line 7 provided in the illustrated glass-molding apparatus 100 is connected, via a hinged joint 31, to a housing 30 covering the pressing drive such that the line can pivot in the same direction as the molding plug 29. At a point spaced from the hinged joint 31, the supply line 7 is further hinged via an actuating rod 32 to the support arm 36, with the length of the rod being dimensioned such that the end 8 of the supply line 7 communicates with the press mold 22 when the molding plug 29 is pivoted.

The function of this glass-molding apparatus is described briefly below.

In the glass-molding apparatus 100, shown in FIG. 2 in an operating state prior to pressing the molded glass body, as it is particularly suited for filling the press mold 22 with the predetermined quantity of molten glass, first the pivoting rod 41 is displaced diagonally downward by the clockwise rotation of the cam disk 46, causing the bracket 36 supporting the rail arrangement 37 to pivot clockwise until the rail arrangement 37 extends vertically. As explained above, the center axes M, M' of the pressing rod 27 and the molding plug 29 coincide with the pressing axis P in this position. The halting of the rotation of the cam disk 46 positions the bracket 36 in this location for the duration of the pressing process, which is initiated by the clockwise rotation of the cam disk 25 via a three-phase servomotor, not shown. The eccentricity of the cam disk 25 displaces the pressing rod 27 downward, where it presses the molding plug 29 into the press mold 22 until a corresponding intermediate space in the desired wall thickness for the molded glass body remains between the inner surface of the press mold 22 and the outer surface of the molding plug 29.

After completion of the pressing process, the molding plug 29 is withdrawn from the press mold 22 after the cam disk 25 is rotated further into its initial position via a device that is not shown. As previously indicated, this device can comprise an elastic element, a counterweight, a hydraulically- or pneumatically-driven cylinder or a countercam disk.

Figure 3:
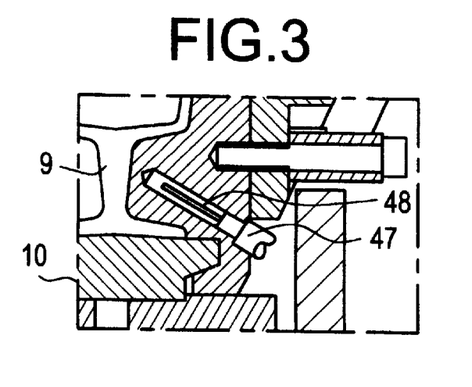
FIG. 3 a sectional view of the press mold provided in the glass-molding apparatus of FIG. 3 (detail A in FIG. 3)

Because the mold base 10 has already been heated by the addition of the predetermined quantity of molten glass, and is practically unreachable via an external cooling, it may be necessary to effect intensive cooling, for example with water circulation, depending on the shape of the molded glass body to be pressed. A possible embodiment for this purpose is illustrated in FIG. 3. In this press mold, a bore 47 is cut into the part forming the lower region of the molded glass body, into which bore a water-injection nozzle 48 with water return via a double-walled pipe is inserted. In the illustrated press mold 29 [sic], which serves in forming a stemmed glass, the water-injection nozzle 48 effects an intensive cooling of the base 10 of the press mold, as well as of the stem region of the molded glass body 9, which does not come into direct contact with the molding plug 29 during the pressing process. If necessary, it is, of course, also possible to additionally effect targeted cooling of the mold base 10 using a further, separate water cooling.

Figure 4:
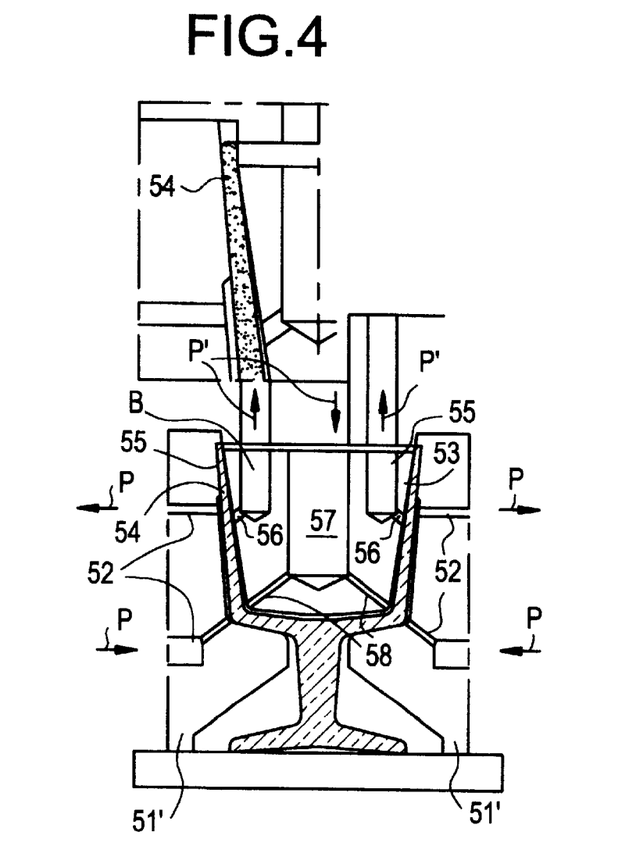
FIG. 4 a possible embodiment of a cooling mold for purposeful cooling and support of the molded glass body after the pressing process.

As previously indicated, the capability of the glass-molding machine of the invention can be significantly increased if the molded glass bodies are lifted out of the press mold when only the regions near the surface have cooled to a temperature to effect sufficient rigidity of the molded glass body. This type of early removal, however, necessitates the transfer of the molded glass body 9 to a downstream cooling station 50, a possible embodiment of which is shown in FIG. 4.

The cooling mold 50 comprises an outer section 51, which is shaped such that the molded glass body is supported against deformation at the necessary points. Cooling channels 52 serving to supply or carry off cool air, as indicated by arrow P, are cut into the outer section 51 of the cooling mold 50.

An interior section 53 of the cooling mold 50 is inserted into the hollow space of the molded glass body 9. As shown in FIG. 4, this part may simultaneously serve the purpose of withdrawing the molded glass body from the cooling mold after it has completely solidified. The interior section 53 of the cooling mold 50 is constructed in a way that, on the one hand, the molded glass body is supported against deformation at necessary points, and, on the other hand, the section encloses the molded glass body, so that sensitive parts—in the example shown, the upper rim 54 of the molded stemmed glass—are not directly vented by the cooling air, in order to avoid tensions and the possible formation of cracks. Likewise, it is also possible to prevent the particularly sensitive regions of the molded glass body from cooling too fast by using additional heating devices integrated into the outer and/or inner section of the cooling mold 50.

As indicated above, the interior section 53 of the cooling device 50 can simultaneously serve as a withdrawal element. For this purpose, an air current indicated by the arrows P' is generated via the two decentralized suction bores 55, which results in a vacuum, via the channels 56, of the air introduced via the central afflux bore 57 and the adjacent channels 58 in a free space in the lower region between the interior section 53 and the molded glass body 9. This vacuum allows the molded glass body 9 to be withdrawn—in the illustrated embodiment, after separation of the two halves 51 and 51' of the outer section 51 of the cooling mold 50. If the molded glass body 9 is in the cooling mold 50, the cooling process may be intensified by the supply of high-pressure cooling air through the afflux bore 57 and the adjoining channels 58 into the free space between the molded glass body 9 and the interior section 53.

Figure 5:
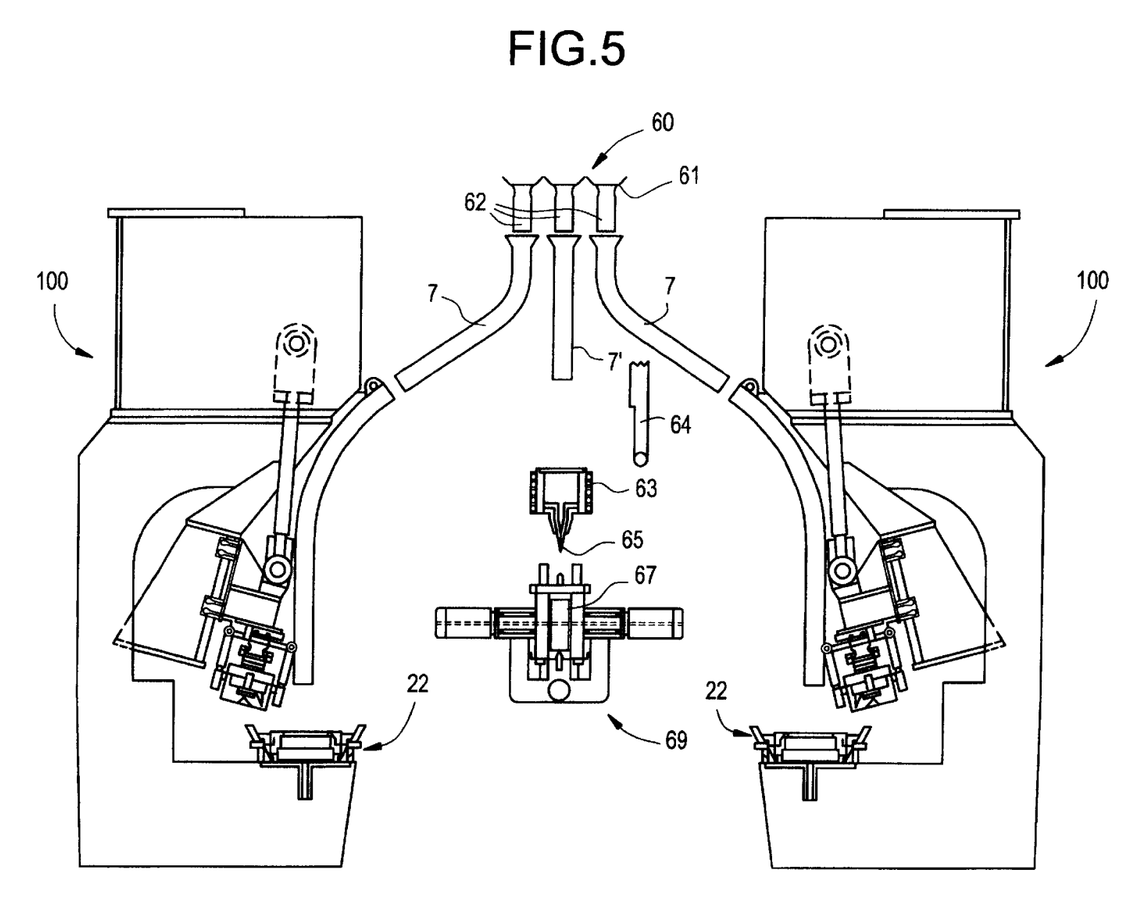
FIG. 5 the structure of an apparatus for producing one of the two halves of a component.

FIG. 5 shows an arrangement in which two glass-molding apparatuses 100 of the invention face each other, thus permitting the production of two halves that can then be joined to form one component. It is pointed out here that the two glass-molding apparatuses 100 need not necessarily be set up facing each other, but can also be grouped in any arbitrary spatial arrangement. It is furthermore conceivable that additional glass-molding apparatuses 100 cooperate if a component is to be produced from a plurality of parts, as described below.

In the arrangement shown in FIG. 5, a feeder simultaneously supplies three quantities of glass 62, partitioned by shears 61, to supply lines 7 and 7'. The equal-volume glass quantities fed into the supply lines 7 are poured into press molds 29 [sic] in the aforementioned manner, in which the halves are formed by the insertion of the molding plug after it has been pivoted back from its laterally-pivoted position shown in FIG. 5. For reasons of a clear overview, the apparatus for pivoting the molding plug, which can be technically embodied, for example, as the glass-molding apparatus of the invention as shown in FIG. 2, is not shown.

The third predetermined quantity of molten glass is supplied to an injection mold 63, where it is forced out through an extrusion die 65 and thereby extruded into a glass body—for example after closing a lid 64 and the injection of compressed air into the injection mold. This extruded glass body serves the purpose of joining two concurrently-produced halves 66 into a component 67, as will be described below.

The details of the production process are described in conjunction with FIGS. 6a to 6g.

Figure 6A:
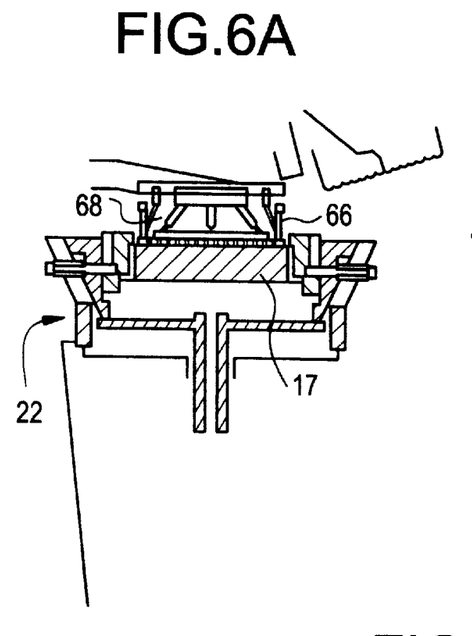
FIGS. 6a, 6b, 6c, 6d, 6e, 6f and 6g a representation of the steps of the withdrawal and joining procedures for both halves in an apparatus of FIG. 5.
Figure 6B:
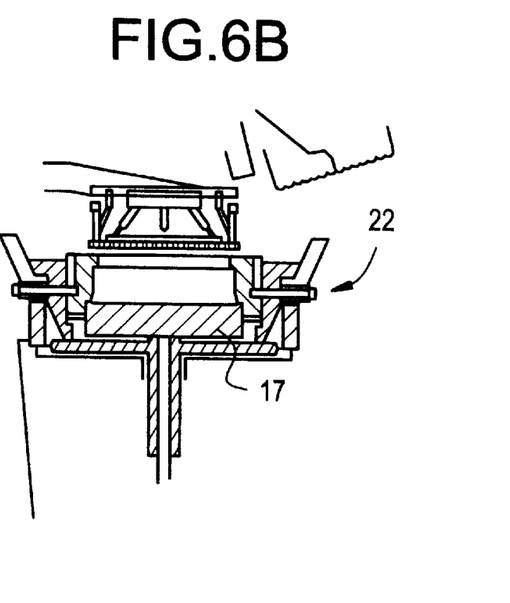
Figure 6C:
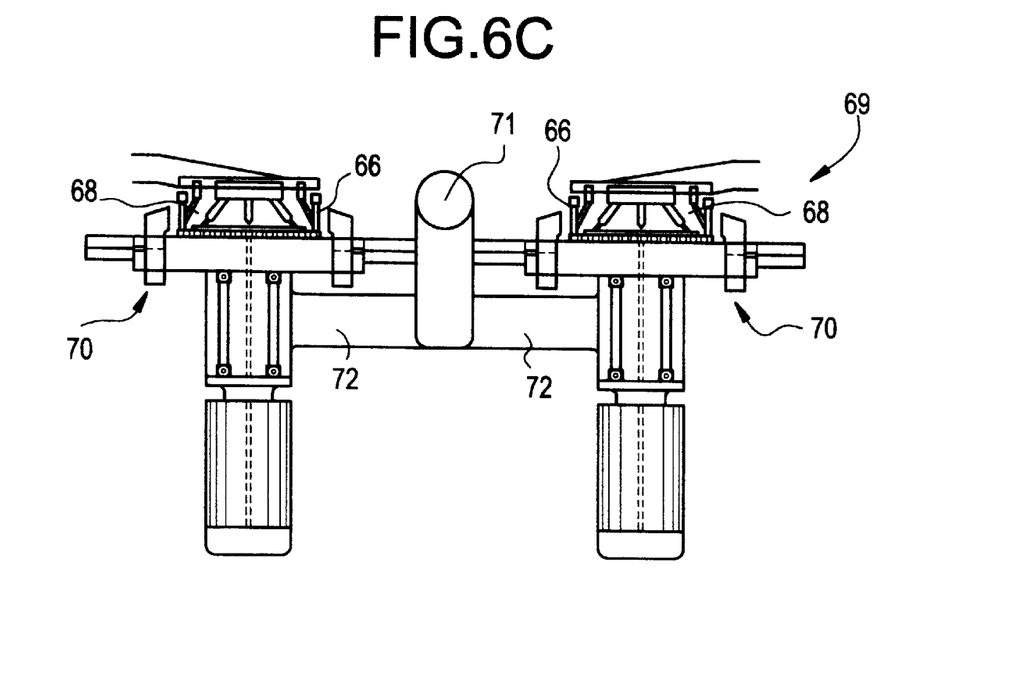

After the actual pressing process, the two halves are respectively withdrawn from the press mold 22 by an withdrawal element 17, which constitutes the bottom of the mold. Afterward, a cooling plug 68 is inserted into the half 66 from above, which corresponds in function to the inner section 53 of the aforementioned cooling mold. Held to the cooling plugs 68 by suction, the halves 66 are then transferred to a welding apparatus 69 as shown in FIG. 6c, which would be disposed between the glass-molding apparatuses 100 if arranged according to FIG. 5.

The welding apparatus 69 comprises two dies 70 that are adapted to the outer contours of the halves. These can include additional cooling devices, not shown.

Figure 6D:
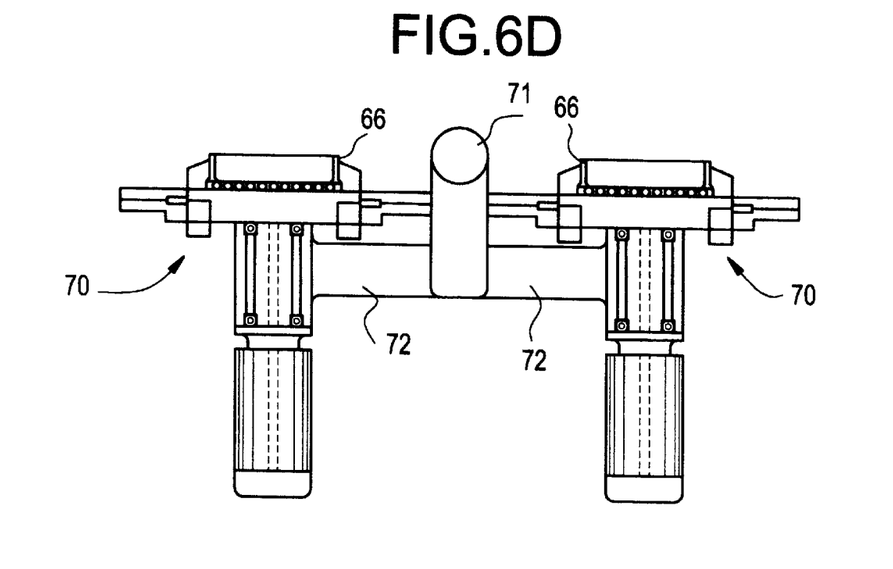
Figure 6E:
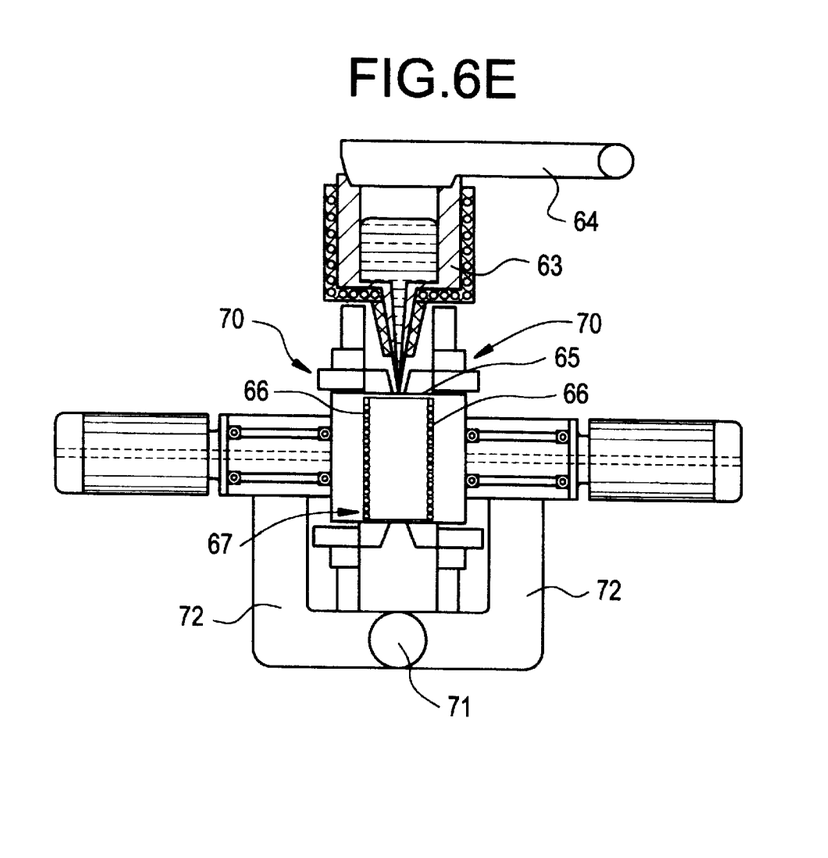

After the two halves 66 have been lowered into the dies 70 of the welding apparatus 69, which is effected with the open sides of both halves up, each of the halves is retained by a die 70 that comprises a plurality of parts and can be opened by the coming together of the [parts] for transfer, and the cooling plugs 68 are withdrawn from the halves 66. The retaining dies 70, which are positioned on offset tool frames 72 that can be pivoted about a common center of rotation 71, are moved toward each other with their open ends facing the respective other piece. This is effected by the pivoting of the two tool frames 72 by 90° in opposite directions. They are retained at a predefined, adjustable distance from each other, which is filled by the glass body extruded from the extrusion die 65 through synchronized displacement of the two halves perpendicular to the glass body and rotation of the two halves via the drive element 73.

Figure 6F:
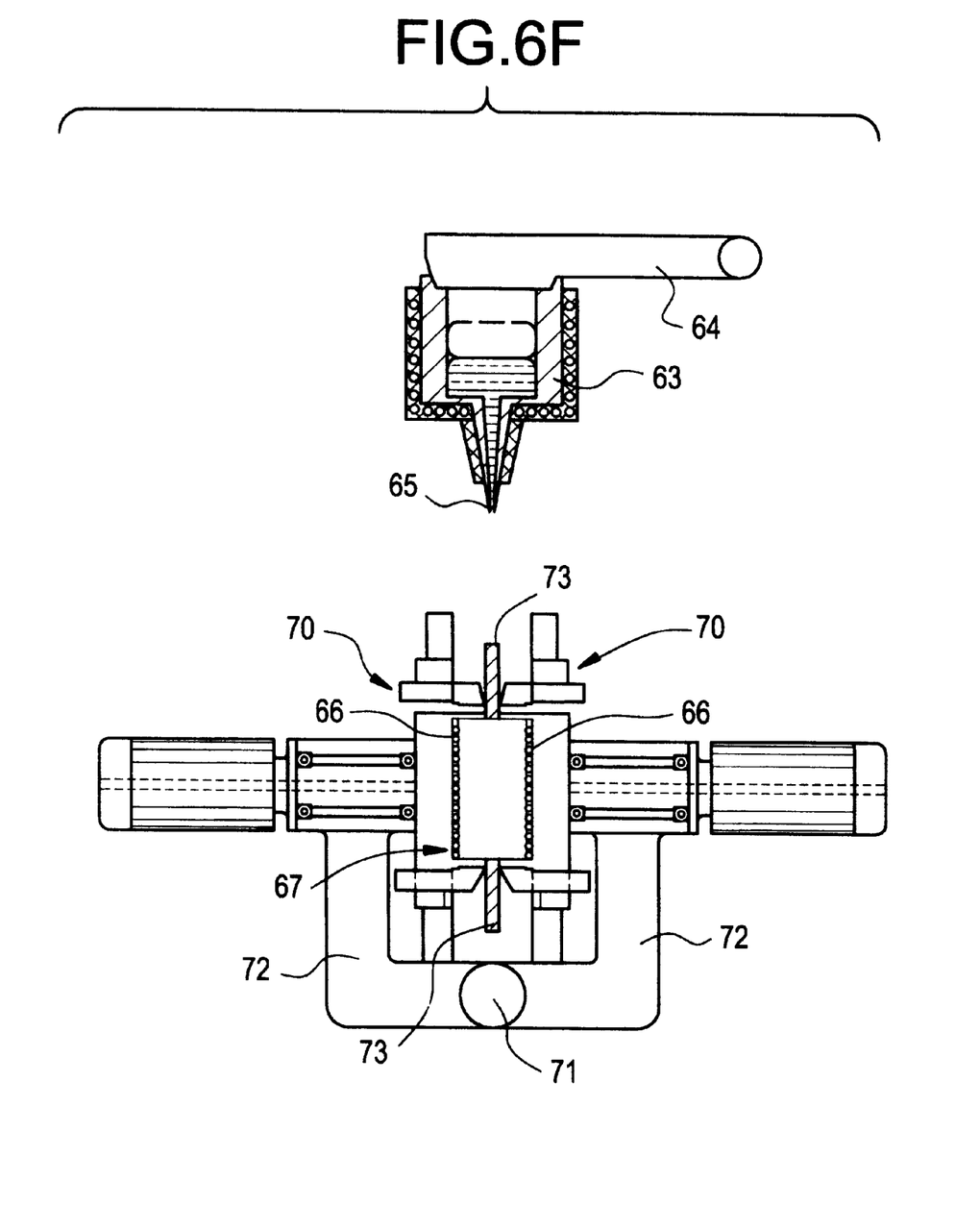

After the welding process, the extruded glass body is separated—for example by means of a strong air current—and the injection mold is separated from the component (FIG. 6f.)

Figure 6G:
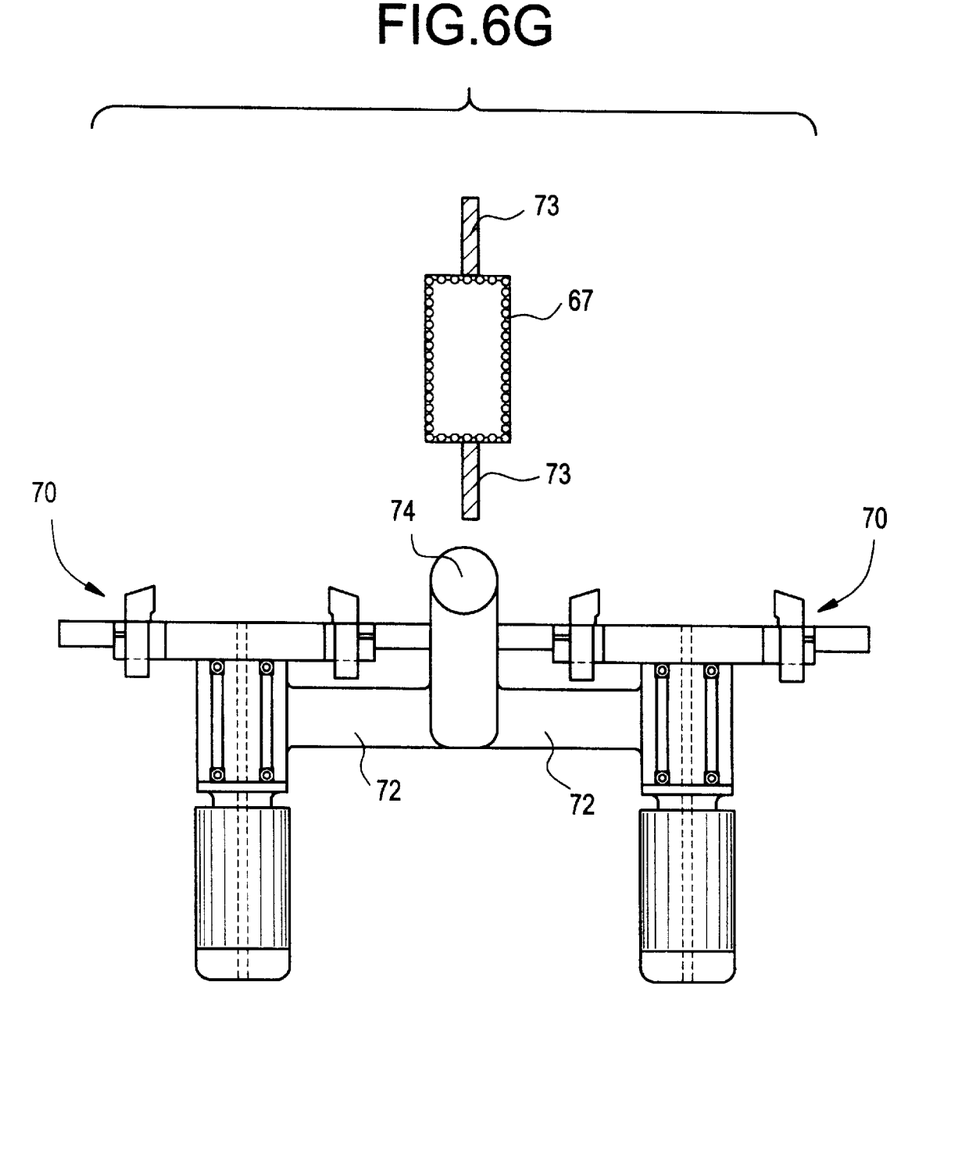

After the component 67 cools to an appropriate temperature, it is clamped by a gripper that extends into the recesses provided for the retaining dies 70; the retaining dies are opened and pivoted back into position to receive two new halves, and the gripper 73 transfers the component to a conveyor belt, for example.

Figure 7A:
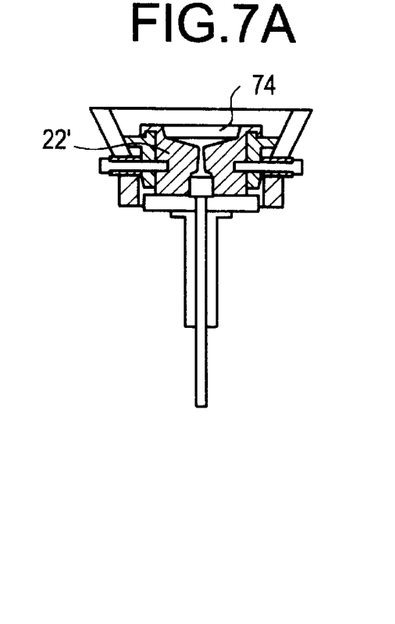
FIGS. 7a, 7b, 7c and 7d the production steps in an apparatus in which the molded glass bodies are formed in two consecutive pressing processes.
Figure 7B:
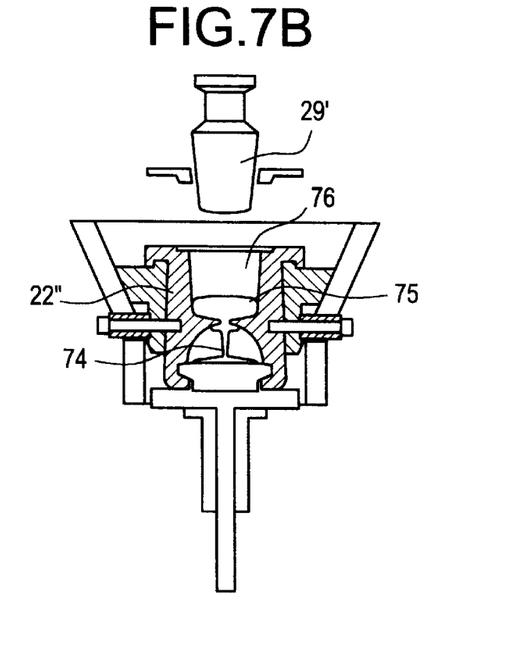
Figure 7C:
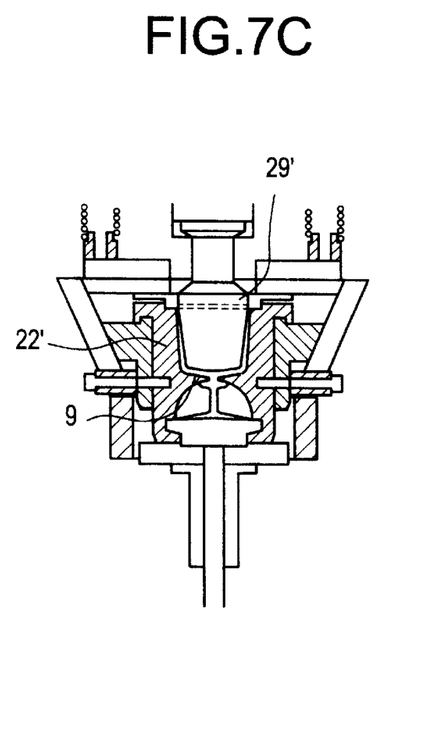
Figure 7D:
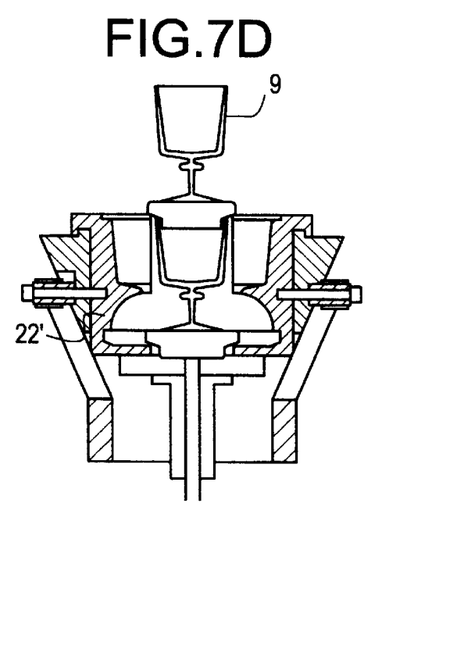

FIGS. 7a to 7d schematically show the steps of a further method that can be advantageously executed with a glass-molding apparatus of the invention. This method is used to produce a part 74 of a molded glass body—in this case the base and stem of a drinking glass—in the press mold 22' of a first glass-molding apparatus not shown in FIG. 7. At the same time, a second glass-molding apparatus of the invention, working parallel to the first one, is used to produce and attach another part of the molded glass body—in this case the cup of the stemmed glass—to the first part. The first part of the glass body, which was produced in an earlier work cycle, is inserted into the press mold 22' before a predetermined quantity 75 of molten glass is added. The press mold 22' is configured in such a way that the section of the first part 74 of the glass body to be attached to the second part of the glass body projects into the pressing space 76, so that the this section is covered with the predetermined quantity 75 of molten glass (FIG. 7b). Afterward, the second part of the molded glass body is molded by the pressing of the molding plug 29' into the press mold 76, and it is simultaneously fixedly attached to the first part (FIG. 7c.) After at least the regions close to the surface of the molded glass body have cooled to a temperature that permits the molded body to be withdrawn from the press mold 22", the body is withdrawn from the press mold 22" with an element 18' especially suited for this purpose, and which simultaneously opens the multi-part mold, as shown in FIG. 8d; the body may subsequently be transferred to a cooling station not shown in the drawing. A particular advantage of this method is that the press mold 22' and the press mold 22" can be supplied simultaneously by the same feeder with two quantities of molten glass that may differ in volume, so that undesirable effects resulting from possible slight differences in the glass composition can be reliably avoided.

Figure 8:
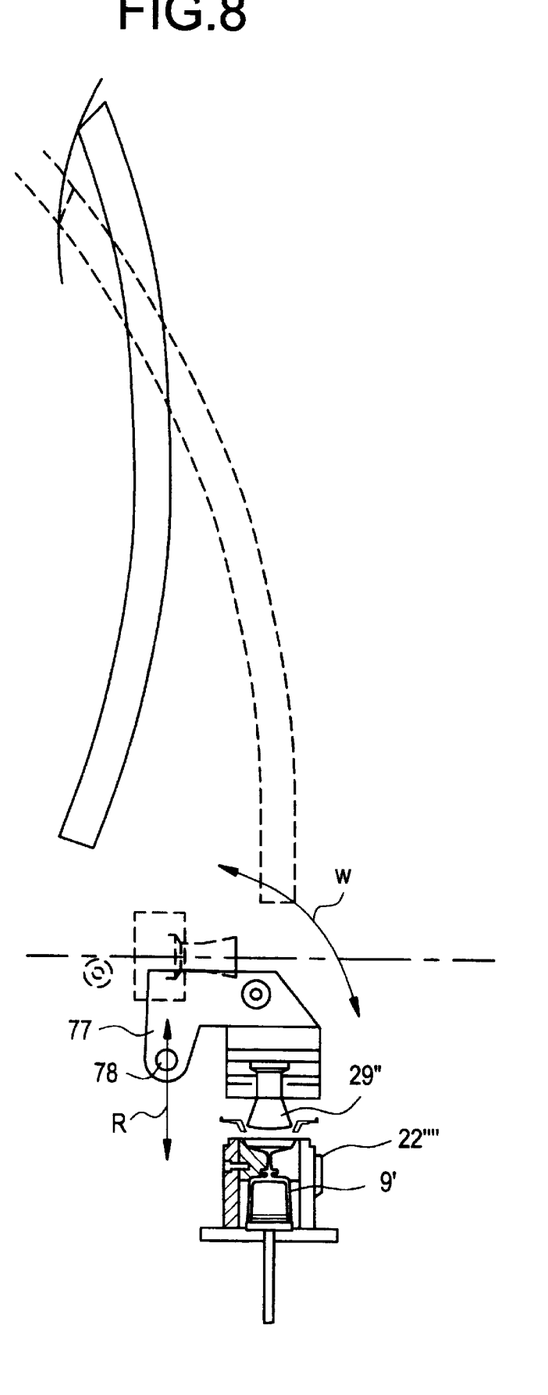
FIG. 8 another preferred embodiment of a pivotably-seated molding plug.

FIG. 8 shows another preferred embodiment of a pivotably-seated molding plug. In this embodiment, the molding plug 29" is attached to the end region of one of the legs of a U-shaped retainer 77, which is hinged to a carriage structure, not shown in the drawing, via a bearing 78 provided in the end region of the other leg. To press a molded glass body 9', the molding plug 29" can be pressed into the press mold 22"" by the displacement of the carriage structure, not shown, in the direction of the arrow R. The position of the molding plug 29" and the retainer 77 immediately after a pressing process is shown in solid lines in FIG. 8. As can also be seen in FIG. 8, the feeder chute 7' is pivoted laterally during this operating state in such a manner that it uncovers the top of the press mold.

To withdraw the molded glass body and subsequently re-supply the press mold 22"" with a predetermined quantity of molten glass, the retainer 77 can be pivoted by 90°, in the direction of the arrow W, about an axis defined by the seating 78 into a position shown in dashed lines in FIG. 8, in which position the molding plug 29" completely uncovers the top opening of the press mold 22"". At the same time, the feeder chute 7' is pivoted into the position shown in dashed lines, in which its end communicates with the opening of the press mold 22"".

As can be seen from the figure, this arrangement has the particular advantage that the molding plug 29" can be pivoted into a position which allows virtually unhindered access to the press mold. This facilitates the removal of a finished glass body and the operation of the apparatus, for example, when press molds are exchanged. However, the pressing forces to be exerted by the molding plug 29" must be transferred from the retainer 77, so this embodiment of the glass-molding apparatus is only suitable for lower molding pressures.

Having thus described the invention, it is claimed:

1. Method of producing molded glass bodies in accordance with the press-molding method, in which a feeder is used to pour a predetermined quantity of molten glass into a press mold, which determines the external shape of the molded glass body and into which the predetermined quantity of molten glass is pressed with the aid of a molding plug that determines the internal shape of the molded glass body and is pressed into the mold from an initial position outside of the press mold during the pressing process, the improvement comprising pouring a predetermined quantity of molten glass into the press mold located in the pressing station before the molding plug is pressed therein, pressing the molding plug into the molten glass according to a predetermined temporal dependency on force and feed withdrawing the molded glass body from the press mold located in the pressing station after withdrawing the molding plug, and that for pouring in the predetermined quantity of molten glass and for withdrawing the molded glass body, pivoting the molding plug laterally from its inoperative position about an axis extending transversely to the longitudinal axis of the molding plug, displacing a feeder chute connected to the feeder from an initial position that allows the molding plug be pressed into the press mold for filling the press mold with a predetermined quantity of molten glass while or after the molding plug is pivoted into a position in which the end of the feeder chute communicates with the opening of the press mold and further pivoting the line back to its initial position after completion of the filling procedure.

2. Method as defined in claim 1 at approximately the same time, a plurality of press molds located in the pressing station receive the predetermined quantity of molten glass prior to the insertion of the molding plug, and pressing molded glass bodies from molten glass with a corresponding number of molding plugs.

3. Method as defined in claim 2, including pressing partial molded bodies that can be joined to form a component concurrently in at least two press molds, and removing from the press molds after at least the regions near the surface of the partial molded bodies have cooled to a temperature that permits withdrawal from the press molds, and transferring to an apparatus for joining partial molded bodies using the heat stored therein.

4. Method as defined in claim 3, wherein in the pressing station, a sequence of press molds and molding plugs serving to form the molded glass body in consecutive steps receives the required, predetermined quantity of molten glass simultaneously from a double-drop or multiple-drop feeder, after the part of the molded glass body from the press mold in the previous sequence has been inserted into the press mold, with the exception of the first press mold in the sequence, and the molding plugs are pressed into the associated press molds approximately simultaneously, so that the further part of the molded glass body is formed with the molding plug previously inserted into the press mold.

5. A glass molding apparatus for producing molded glass bodies in accordance with a press-molding method, said apparatus having a frame, at least one pressing station which includes a press mold that determines the external shape of the molded glass body, and into which a predetermined quantity of molten glass can be poured and pressed into a molded glass body by a molding plug that determines the internal shape of the molded glass body, the apparatus further including means for generating a force for pressing the molding plug into the mold from an initial position outside of the press mold, in the direction of the longitudinal axis of the molding plug, according to a predetermined temporal dependency on force and feed, the apparatus further including a device for withdrawing the molding plug after a completed pressing process, the improvement comprising the molding plug including means for pivoting from said initial position outside of the press mold about an axis extending transversely to the center axis of the molding plug, wherein a bracket that can pivot about a pivoting axis extending transversely to the pressing direction is connected to the frame of the apparatus, the bracket having a rail arrangement that serves in the displaceable seating of the molding plug by means of a carriage structure.

6. Apparatus as defined in claim 5, wherein the bracket is supported on the frame by means of a variable-length pivoting device that acts perpendicularly to the pivoting axis.

7. Apparatus as defined in claim 6, wherein the variable-length pivoting apparatus includes a spring-loaded pivoting rod hinged by one end to the bracket and guided to be displaceable in its axial direction, and rests, under the spring force, with its other end against a cam disk driven by an electric motor.

8. Apparatus as defined in claim 5, wherein the end of pressing rod that operates the molding plug is connected to the molding plug by means of a knee joint whose hinge axis is parallel to the pivoting axis.

9. Apparatus as defined in claim 5, a feeder chute being provided that is connected to a feeder and can be displaced into a position in which its end communicates with the opening of the press mold, wherein the feeder chute is hinged to the frame and is connected to the pivotable bracket.

* * * * *